FREQUENCY SELECTIVE AMPLIFIER

Filed Dec. 21, 1961

INVENTOR
GENUNG L. CLAPPER
BY G. R. Dugger
AGENT

United States Patent Office 3,193,774
Patented July 6, 1965

3,193,774

FREQUENCY SELECTIVE AMPLIFIER

Genung L. Clapper, Vestal, N.Y., assignor to International Business Machines Corporation, New York, N.Y., a corporation of New York Filed Dec. 21, 1961, Ser. No. 161,090
2 Claims. (Cl. 330—28)

This invention relates to a frequency selective amplifier and more particularly to an amplifier circuit which will respond only to a single frequency or a narrow band of frequencies.

In speech or sound-analysis work where the waveform being analyzed is obtained from a microphone and amplifier and represents the waveform of the sound which it is desired to analyze, it is particularly desirable to employ a selective circuit the response of which is a percentage function of frequency. Many frequency selective systems are in use today which employ inverse feedback or degenerative circuits for producing an output having a certain characteristic feature. For example, the characteristic feature of the response curve may be that a single frequency or band of frequencies is cancelled out practically entirely, while a reasonable degree of transmission is obtained at other frequencies. Or the characteristic may be just the inverse with the circuit responding to a single frequency or a narrow band of frequencies and attenuating or eliminating frequencies outside of this range.

In either of the above cases the characteristic can be obtained in a network using only resistances and capacitors such as, for instance, the Wheatstone bridge, including the Wien bridge, and a double-T or parallel-T network. However, the use of such networks has not produced altogether satisfactory results due to the fact that such networks have a logarithmic characteristic and hence the output of the selective circuit is not as linear and sharp as it should be. The present invention overcomes this shortcoming by providing a frequency selective transistor circuit employing a parallel-T network and further provided with a novel feedback arrangement between the parallel-T network and the input stage whereby the output characteristic curve of the circuit is linearized and made much sharper than it normally would be.

In providing a much improved linear output, the present circuit utilizes a pair of transistor amplifiers and a parallel-T filter network. The arrangement is such that a first transistor is devoted to amplifying the input signal and putting it out to the filter network and the second transistor is devoted to amplifying the feedback signal from the filter network and controlling thereby the characteristics of the input transistor. The second or controlling transistor has its collector connected back to the emitter of the input transistor and both the D.C. and A.C feedback from the filter network is essentially inverted and then applied as a current control upon the emitter current of the first input transistor. There is, in effect, a shunt placed across the input transistor and, in so doing, the normal logarithmic tendency of the filter network is changed to a linear one because the shunt control has an antilog tendency which is a reverse, you might say, to the logarithmic tendency and which when it is added to the normal logarithmic tendency of the filter network produces a linearization.

Accordingly, a principal object of the present invention is to provide an improved frequency selective circuit which produces an output having a sharp linear characteristic.

A further object of the present invention is to provide a frequency selective amplifier circuit employing a filter network and having a novel feedback arrangement for linearizing the output of the circuit.

A still further object of the present invention is to provide a novel frequency selective amplifier circuit having an input transistor and including means for controlling the current characteristics of the input transistor.

A still further object of the prsent invention is to provide a novel frequency selective amplifier circuit having an input transistor and filter circuit and including a shunt control circuit for producing linearization.

A still further object of the present invention is to provide a novel frequency selective circuit which responds to a single frequency or a narrow band of frequencies and which includes novel means for adjusting the band width.

The foregoing and other objects, features and advantages of the invention will be apparent from the following more particular description of a preferred embodiment of the invention, as illustrated in the accompanying drawings.

Figure 1:
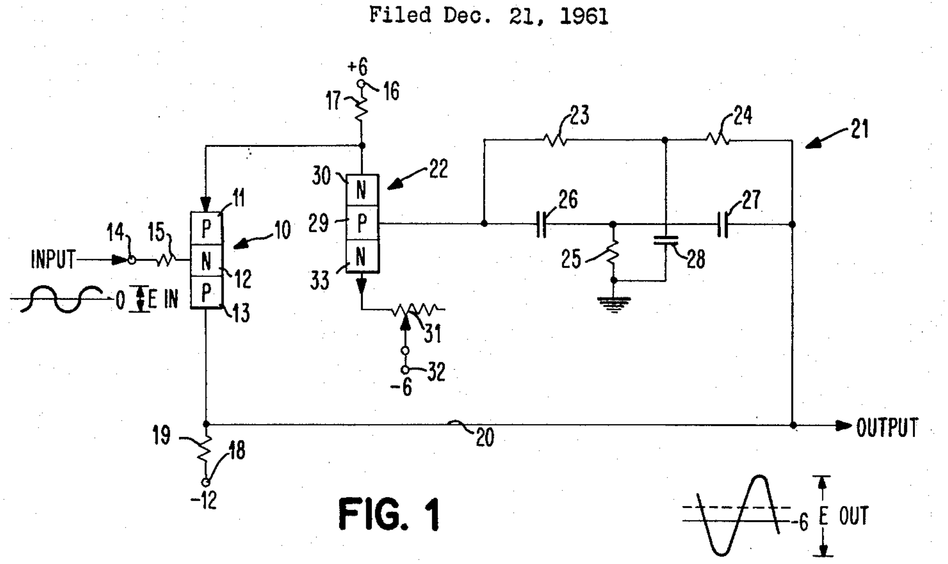
FIG. 1 shows an embodiment of a frequency selective amplifier circuit in accordance with the present invention.

Referring to FIG. 1, the circuit comprises an input amplifying transistor 10 having an emitter electrode 11, a base electrode 12 and a collector electrode 13. The base electrode 12 is connected to an input terminal 14 through a resistor 15 and the emitter electrode 11 is connected to a positive 6 volt terminal 16 through a resistor 17. The collector electrode 13 is connected to a negative 12 volt terminal 18 through a resistor 19. In accordance with the present invention, the collector output line 20 from input transistor 10 is shown connected to a shunt control circuit which comprises a conventional parallel-T network 21 and a control transistor 22.

The conventional parallel-T network 21 consists of two T networks connected in parallel and comprises the resistors 23, 24 and 25 and the capacitors 26, 27 and 28. This particular type of network is extremely useful at audio frequencies. As is well known, a circuit of this type has certain phase characteristics such that at a certain frequency it will not pass signals. One condition of balance for such a network is obtained when capacitance 26 equals capacitance 27, each equaling one-half of capacitance 28, when resistance 23 equals resistance 24, each resistance 23 and 24 equaling two times resistance 25, and when the reactance of capacitance 26 is equal in magnitude to resistance 23.

The feedback signal from the parallel-T network 21 is shown being applied to the base electrode 29 of the control transistor 22. The collector electrode 30 of the control transistor is connected to the positive 6 volt terminal 16 through the load resistor 17 and it is also connected back to the emitter of the input transistor 10. In this manner, the feedback signal is amplified and utilized to control the characteristics of the input stage. There is a D.C. feedback through the resistor network which also controls the operating characteristics and compensates for such things as variations in gain and so on in the transistor 10, variations that may occur in temperature and which would tend to shift the level, etc. The A.C. characteristics, which are of primary concern, are applied through the capacitors, amplified and essentially inverted, and then applied as a current control upon the emitter current of the input stage to change the characteristics to the output. When the control transistor 22 is conducting, it is taking current away from the input transistor and therefore preventing operation of its output. In this way, the gain of the input transistor 10 is reduced to well below unity. It may be thought of as a shunt placed across the input transistor and there is an antilog tendency which when added to the normal logarithmic tendency of the filter produces a linearization. This is shown by the waveform in FIG. 2 which is substantially linear and narrow.

Another feature of the present circuit resides in the arrangement for changing the band width. This arrangement comprises a variable resistor 31 connected between a negative 6 volt terminal 32 and the emitter electrode 33 of the control transistor. Adjustment of resistor 31 will effectively change the gain or the current carrying capacity of the control transistor. By increasing the resistance 31, it is possible to broaden the filter characteristic to any degree desired up to a certain range.

Figure 2:
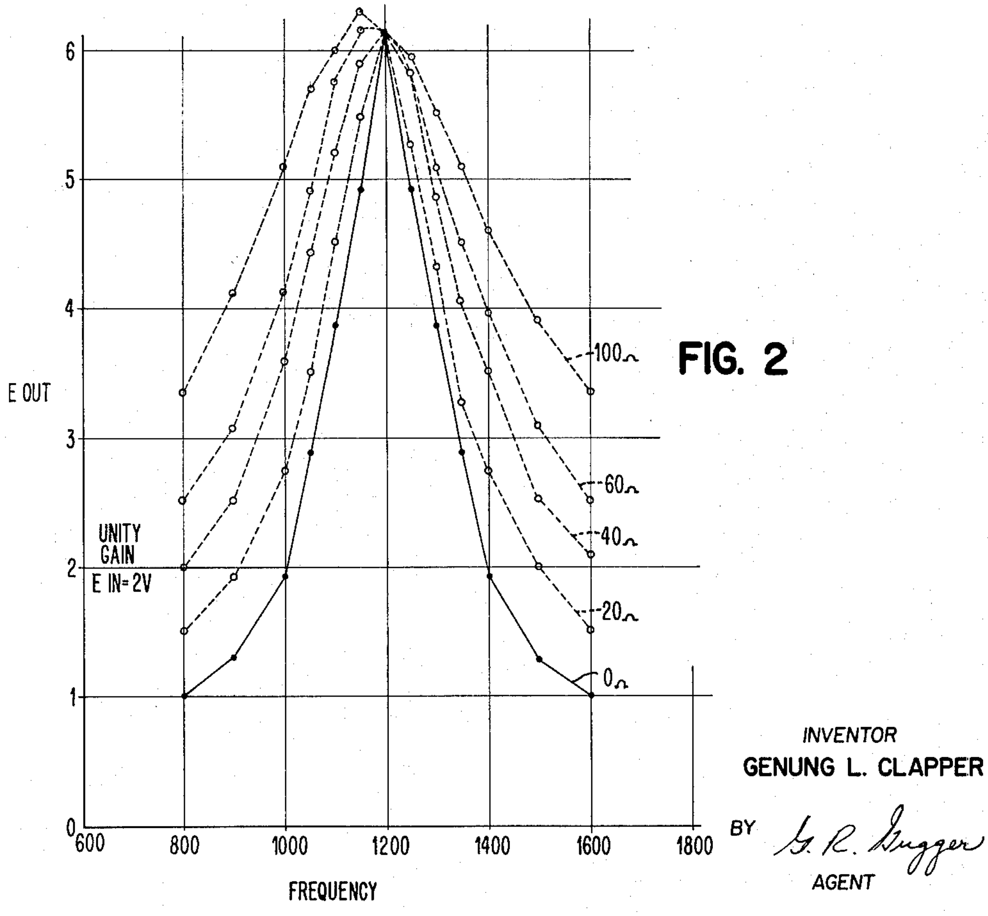
FIG. 2 is a diagram showing a representative output waveform characteristic for the circuit shown in FIG. 1.

In illustrating the operation of the circuit, a null frequency of 1200 c.p.s. was selected, as shown in FIG. 2. At this frequency, the emitter 11 of the input transistor is substantially at ground potential and input transistor 10 acts as a grounded emitter amplifier. It will be noted that emitter 11 is returned through the resistor 17 so that the input transistor will operate as a class A amplifier and is never cut off thereby avoiding undesirable clipping effects. At the null frequency of 1200 c.p.s. then, the input signal is amplified and inverted, the parallel-T network is non-responsive and hence the control transistor 22 is in a non-conductive state, and a maximum output of 6 volts is obtained. The input to terminal 14 may be taken from any suitable variable oscillator and as the frequency of the input signal departs from the null frequency of 1200 c.p.s., the parallel-T network will become more responsive and the signal at the base 29 of the control transistor 22 increases. The NPN control transistor goes into conduction and the feedback signal from the parallel-T network is amplified and inverted and applied to the emitter 11 of the input transistor in a degenerative manner. The signal appearing at emitter 11 is substantially equivalent to the input signal at terminal 14 and the gain of the input transistor 10 is accordingly reduced to well below unity for all frequencies other than the null frequency. There is thus produced an output waveform which is substantially linear and narrow. There is shown in FIG. 2, a plot of frequency and output voltage for several settings of the band control potentiometer 31.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A frequency selective circuit comprising a PNP transistor having an input to the base and an output from the collector, an NPN transistor, a parallel-T circuit connected at its input to the collector output of said PNP transistor and at its output to the base of said NPN, an impedance, means for connecting the emitter of said PNP transistor and the collector of said NPN transistor together in series with said impedance to a source of supply voltage wherein variations in conductivity of said NPN transistor will inversely control conductivity in said PNP transistor, whereby an input signal applied to the base of said PNP transistor will have the frequency characteristics thereof attenuated in accordance with the characteristics of the filter and the characteristics of the NPN transistor shunting said PNP transistor.

2. The apparatus of claim 1 further including an adjustable resistor in the emitter circuit of said NPN transistor.

References Cited by the Examiner

UNITED STATES PATENTS

| | | | |
|---|---|---|---|
| 2,173,426 | 9/39 | Scott | 330—85 X |
| 2,858,424 | 10/58 | Stern et al. | 330—17 X |

ROY LAKE, *Primary Examiner.*

JOHN KOMINSKI, *Examiner.*